US008132799B2

(12) United States Patent
McIntosh et al.

(10) Patent No.: US 8,132,799 B2
(45) Date of Patent: Mar. 13, 2012

(54) PIN CLAMP ACCESSORIES

(75) Inventors: Bruce D. McIntosh, Monroeville, IN (US); Kenneth A. Steele, Fort Wayne, IN (US)

(73) Assignee: PHD, Inc., Fort Wayne, IN (US)

(*) Notice: Subject to any disclaimer, the term of this patent is extended or adjusted under 35 U.S.C. 154(b) by 244 days.

(21) Appl. No.: 12/421,893

(22) Filed: Apr. 10, 2009

(65) Prior Publication Data

US 2009/0236785 A1 Sep. 24, 2009

Related U.S. Application Data

(63) Continuation-in-part of application No. 11/098,177, filed on Apr. 4, 2005, now Pat. No. 7,182,326.

(60) Provisional application No. 60/630,791, filed on Nov. 24, 2004, provisional application No. 60/559,364, filed on Apr. 2, 2004, provisional application No. 60/636,304, filed on Dec. 15, 2004.

(51) Int. Cl.
*B23Q 3/08* (2006.01)

(52) U.S. Cl. ........................................ 269/32; 269/27

(58) Field of Classification Search .................... 269/32, 269/20, 24–28, 91–95, 228
See application file for complete search history.

(56) References Cited

U.S. PATENT DOCUMENTS

| | | | | |
|---|---|---|---|---|
| 6,786,478 | B2 * | 9/2004 | Pavlik et al. | 269/49 |
| 6,913,254 | B2 * | 7/2005 | Pavlik et al. | 269/49 |
| 7,182,326 | B2 * | 2/2007 | McIntosh et al. | 269/32 |
| 7,311,301 | B2 * | 12/2007 | Liu et al. | 269/32 |
| 7,516,948 | B2 * | 4/2009 | McIntosh et al. | 269/32 |
| 7,815,176 | B2 * | 10/2010 | McIntosh et al. | 269/32 |
| 2006/0125167 | A1 * | 6/2006 | Steele et al. | 269/32 |
| 2009/0236785 | A1 * | 9/2009 | McIntosh et al. | 269/32 |

* cited by examiner

*Primary Examiner* — Lee D Wilson
(74) *Attorney, Agent, or Firm* — Barnes & Thornburg LLP

(57) ABSTRACT

The present disclosure provides a pin clamp having first, second and third pins, a finger and stripper assembly. The first pin moves in response to an actuation. At least one finger is positioned adjacent the first pin, and is movable between clamped and unclamped positions. The second pin is located adjacent the first pin and is in operable communication with the finger. The stripper assembly comprises the third pin that is selectively engagable with the second pin, and an actuator that moves the third pin. The first activation of the actuator moves the third pin causing it to engage the second pin causing it to move the finger to the clamped position. The second actuation of the actuator moves the third pin causing it to disengage from the second pin causing it to not move the finger to the clamped position.

6 Claims, 16 Drawing Sheets

PIN CLAMP ACCESSORIES

RELATED APPLICATIONS

The present application is related to and claims priority to U.S. patent application Ser. No. 11/284,446, filed on Nov. 22, 2005, entitled Pin Clamp Accessories, issuing as U.S. Pat. No. 7,516,948 on Apr. 14, 2009, and to Provisional Patent Application Ser. No. 60/630,791, filed on Nov. 24, 2004, entitled Pin Clamp Accessories. The present application is also a continuation-in-part of U.S. patent application Ser. No. 11/098,177, filed on Apr. 4, 2005 now U.S. Pat. No. 7,182,326, entitled Pin Clamp issuing as U.S. Pat. No. 7,182,326 on Feb. 27, 2007, which is related to and claims priority to U.S. Provisional Patent Application Ser. No. 60/559,364, filed on Apr. 2, 2004, entitled Pin Clamp and to U.S. Provisional Patent Application Ser. No. 60/636,304, filed on Dec. 15, 2004, entitled Pin Clamp Assembly. The subject matter disclosed in the applications is hereby expressly incorporated into the present application.

TECHNICAL FIELD

The present disclosure is generally related to gripper or clamp assemblies. More specifically, the present disclosure is related to pin clamps that can selectively grip a workpiece as well as assemblies that are coupled to the pin clamps to affect their operation.

BACKGROUND AND SUMMARY

Pin clamps which use movable locating pins to engage and grip a workpiece are known. Characteristically, such pin clamps employ a reciprocally or rectilinearly moving locating pin with a movable finger or fingers positioned therein. The locating pin extends to engage a hole in a workpiece such as a metal sheet. The locating pin then retracts causing the finger or fingers within the locating pin to extend and hold the workpiece against the clamp body.

Conventional pin clamps, however, do not include devices that move the locating pin to a clamping position without extending the fingers, or can hold the locating pin in a particular position absent actuation force. Because the possibility exists that material from a clamped workpiece may get stuck on the clamp, being able to move the locating pin without having the finger or fingers extend may be useful at dislodging the material. It may also be useful for certain pin clamps to be able to hold the locating pin in a particular position even under an unexpected loss of pressure.

Accordingly, an illustrative embodiment of the present disclosure provides a pin clamp assembly which comprises first, second and third pins, a finger and stripper assembly. The first pin moves in response to an actuation. At least one finger is positioned adjacent the first pin, and is movable between clamped and unclamped positions. The second pin is located adjacent the first pin and is in operable communication with the finger. The stripper assembly comprises the third pin that is selectively engagable with the second pin, and an actuator that moves the third pin. The first activation of the actuator moves the third pin causing it to engage the second pin causing it to move the finger to the clamped position. The second actuation of the actuator moves the third pin causing it to disengage from the second pin causing it to not move the finger to the clamped position.

In the above and other illustrative embodiments, the pin clamp assembly may further comprise: actuation of the first pin to move the second pin; disengagement between the second and third pins to maintain the finger in the unclamped position; the actuator of stripper assembly being pneumatic powered; the first pin having a cavity disposed therein configured to receive at least a portion of the second pin; the second pin having a cam pathway disposed therein configured to receive a portion of the third pin such that movement of the second pin is limited by the shape of the cam pathway and the portion of the third pin following the cam pathway as the second pin moves; engagement between the cam pathway and the portion of the third pin, and movement of the second pin, moves the finger to the clamped position; second actuation of the actuator causes the portion of the third pin to be removed from the cam pathway so that movement of the second pin is no longer limited by the shape of the cam pathway and the finger does not move to the clamped position; and disengagement of the third pin from the cam pathway allows the finger to be located in the unclamped position even if the finger would other wise be moved to the clamped position upon movement of the locating pin.

Another illustrative embodiment of the present disclosure provides a pin clamp assembly which comprises a body, a locating pin, a twist pin, and a stripper assembly. The body defines an internal cavity and an opening from the cavity to the exterior of the body. The locating pin is at least partially disposed in the cavity and extends out of the opening to a distal end. At least a portion of the twist pin is located in the locating pin. Upon actuation of the pin clamp assembly, the twist pin and the locating pin moves. The stripper assembly comprises a stripper pin which is at least partially disposed in the body and which selectively engages and disengages the twist pin to cause or inhibit particular movement of the twist pin.

In the above and other illustrative embodiments, the pin clamp assembly may further comprise: the stripper assembly further comprising an actuator that moves the stripper pin to cause the stripper pin to selectively engage and disengage the twist pin; the actuator being a pneumatic piston assembly; the pneumatic piston assembly extending and retracting the stripper pin to engage and disengage the twist pin; the pin clamp assembly further comprising at least one finger supported by the locating pin exterior of the body and configured to extend and retract upon the particular movement of the twist pin; actuation of the pin clamp assembly and selective engagement of the twist pin by the stripper pin causes rotational movement of the twist pin to extend the finger; actuation of the pin clamp assembly and selective disengagement of the twist pin by the stripper pin does not cause the rotational movement of the twist pin which does not extend the finger; the pin clamp assembly further comprising a plurality of fingers supported by the locating pin exterior of the body and configured to extend and retract upon the rotational movement of the twist pin.

Another illustrative embodiment of the present disclosure provides a pin clamp assembly which comprises a locating pin that is movable with respect to a body, wherein retraction of the locating pin with respect to the body causes extension of at least one finger configured to hold a workpiece adjacent the body, and a stripper assembly for selectively preventing the finger from holding a workpiece upon retraction of the locating pin. In the above and other illustrative embodiments, the pin clamp assembly may further comprise the stripper assembly comprising an actuator for selective extension and retraction of the finger independent of the movement of the locating pin.

Another illustrative embodiment of the present disclosure provides a method of operating a pin clamp assembly that comprises a locating pin that moves rectilinearly, holds a workpiece by actuating at least one finger located adjacent the locating pin. The method comprises the steps of: providing a stripper assembly that selectively prevents the finger from actuating; actuating a member extending from the stripper assembly which causes that member to disengage from a portion of the pin clamp assembly that moves the finger; actuating the locating pin to move the same in a first direction; and moving the locating pin in the first direction without actuating the finger.

In the above and other illustrative embodiments, the method of operating a pin clamp assembly further comprises the steps of: actuating the member which causes it to engage the portion of the pin clamp assembly that moves the finger; actuating the locating pin to move it in the first direction; moving the locating pin in the first direction; and actuating the finger to move and engage a workpiece. The method may further comprise the steps of: actuating the member which causes it to engage the portion of the pin clamp assembly that moves the finger; actuating the locating pin to move it in a second direction; positioning the locating pin adjacent the workpiece; actuating the locating pin again; moving the locating pin in the first direction; actuating the finger by the engagement of the portion of the pin clamp assembly that moves the finger and the finger; and engaging the workpiece by the finger.

Additional features and advantages of the pin clamp assembly and accessories will become apparent to those skilled in the art upon consideration of the following detailed description of the illustrated embodiment exemplifying the best mode of carrying out the pin clamp assembly and accessories as presently perceived.

BRIEF DESCRIPTION OF DRAWINGS

The present disclosure will be described hereafter with reference to the attached drawings which are given as non-limiting examples only, in which.

Figure 1:
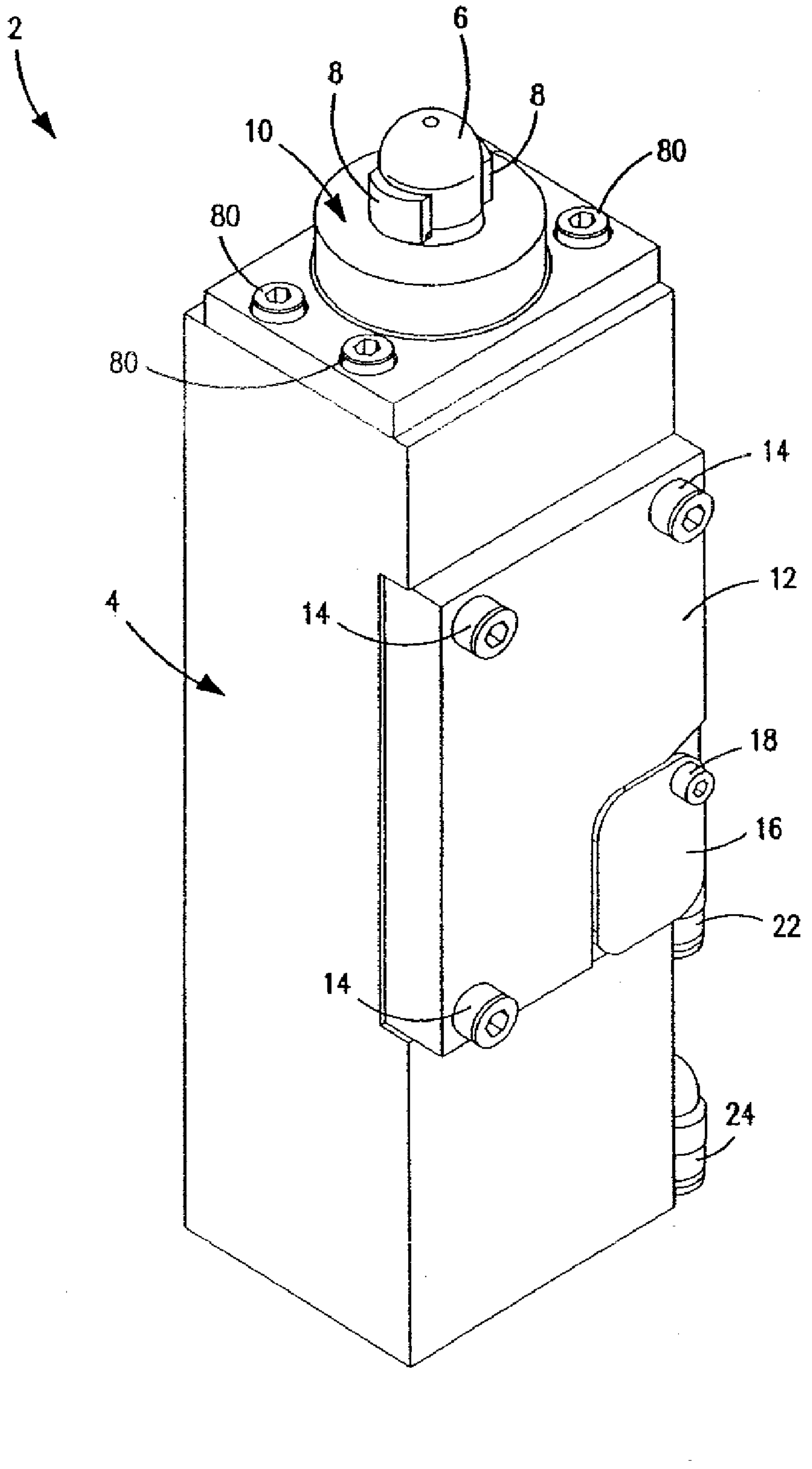
FIG. 1 is a perspective view of an illustrative embodiment of a pin clamp assembly.

Corresponding reference characters indicate corresponding parts throughout the several views. The exemplification set out herein illustrates embodiments of the pin clamp assembly and accessories, and such exemplification is not to be construed as limiting the scope of the pin clamp assembly and accessories in any manner.

DETAILED DESCRIPTION OF THE DRAWINGS

A perspective view of an illustrative embodiment of pin clamp 2 is shown in FIG. 1. Pin clamp 2 illustratively comprises a housing 4 with a locating pin 6 extending therefrom. Fingers 8 are configured to selectively extend and retract from locating pin 6. For example, when the locating pin 6 is retracted (as shown), fingers 8 are moved to the extended position (also as shown). Conversely, when locating pin 6 is extended upwardly, fingers 8 are retracted. (See, e.g., FIG. 4*a*.) Accordingly, pin clamp 2 has the ability to extend the locating pin 6 through a bore in a workpiece and then retract and use the fingers to hold the workpiece against plate surface 10. Also shown in this view is cover plate 12 illustratively attached to housing 4 via fasteners 14. This plate allows access to the interior of housing 4 without having to disassemble the pin clamp assembly 2. A secondary cover 16 is attached to cover plate 12 via fastener 18. This allows selective access to the interior of housing 4, as well. In one illustrative embodiment, the access is to unlock mechanism 20. (See e.g. FIGS. 5*a, b* and 6.) This illustrative embodiment also shows fluid ports 22, 24. In this illustrative embodiment pneumatic pressure is supplied to fluid port 22 which causes the locating pin 6 to retract. Conversely, pneumatic fluid supplied to port 24 causes locating pin 6 to extend. It is appreciated that in alternative embodiments other power sources may be employed. For example, electrical power (see FIGS. 9-11), as well as hydraulic fluid power, may be used in place of pneumatic power.

Figure 2:
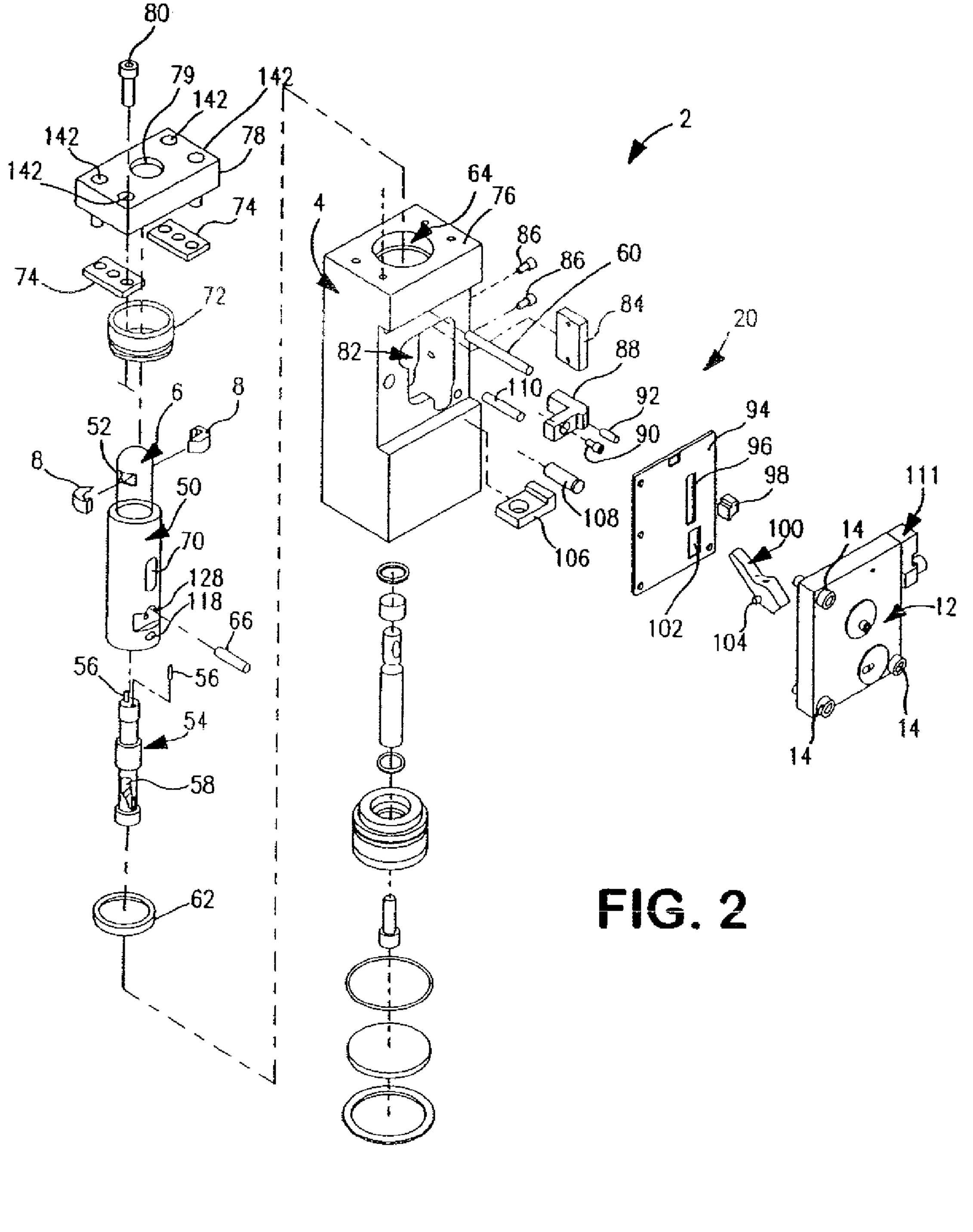
FIG. 2 is an exploded view of the pin clamp assembly of FIG. 1.

An exploded view of pin clamp assembly 2 is shown in FIG. 2. As shown herein, housing 4 is configured to receive pneumatic power supply 26. Power supply assembly 26 comprises a piston 28 that receives a piston rod 30 which are illustratively fastened together via fastener 32. Seals 34, 36, and 38 are configured to maintain a pressurized system. End cap 40 is configured to cover the bore 42 disposed in housing 4 and is secured thereon by a retaining ring 44. (See also FIG. 3*a*.) Collar 46 is disposed about piston rod 30 to provide a bearing surface between seals 36, 38.

A locating pin assembly 48 comprises locating pin 6 with a body 50 depending therefrom. Fingers 8 are shown to be insertable into cavity 52. In this illustrative embodiment, body 50 and locating pin 6 share a hollow interior that is configured to receive twist pin 54. Pins 56 are located at the end of twist pin 54 and are configured to engage fingers 8 such that as twist pin 54 is caused to rotate, pins 56 engage respective fingers 8 to extend or retract them as desired. Twist pin 54 also includes a cam slot 58 that extends the entire diameter of twist pin 54 so that a single dowel or cam pin 60 can be disposed completely through twist pin 54 to allow travel of same along the path of cam slot 58. Wiper seal 62 is located within bore 64 of housing 4 and is engagable with the body 50 of locating pin 6 to prevent contaminants from damaging the same. (See, also, FIG. 8*d*.) A dowel pin 66 is configured to be disposed through body 50, as well as disposed through slot 68 of piston rod 30. In one illustrative embodiment, slot 68 is elongated so that locating pin 6 can have independent movement of pneumatic power supply 26. In this illustrative embodiment such independent movement is useful for locking, and particularly unlocking mechanism 20. Also included in body 50 is slot 70 configured to receive cam pin 60 that is also disposed through cam slot 58.

A collar 72 is disposed in bore 64. Shims 74 are placed on the top 76 of housing 4 and are used as spacers to adjust the height of sleeve 78, which has a bore 79 that locating pin 6 is to extend through to the exterior of housing 4. Fasteners 80 can be used to attach sleeve and shim assembly to housing 4.

A cavity 82 is also disposed into housing 4 and is configured to receive portions of unlocking mechanism 20. Unlocking mechanism 20 comprises plate 84 which is attached to the interior of cavity 82 via fasteners 86. Spring holder 88 is fastened to body 50 via fastener 90 and includes an illustrative pin 92 that is configured to be disposed through slot 96 of plate 94 and engage a switch target 98. An illustrative lever 100 is configured to be disposed through opening 102 in plate 94 and selectively engage spring holder 88. In this illustrative embodiment, lever 100 is configured to pivot at pivot point 104 to selectively unlock fingers 8. It is appreciated that in alternative embodiments lever 100 can be replaced with other structures or mechanisms to unlock fingers 8. Also shown are lock release 106, pin 108, and pin 110. Further shown in this illustrative embodiment is an amplifier box 111 that is used to assist in detecting switch target.

Figure 3A:
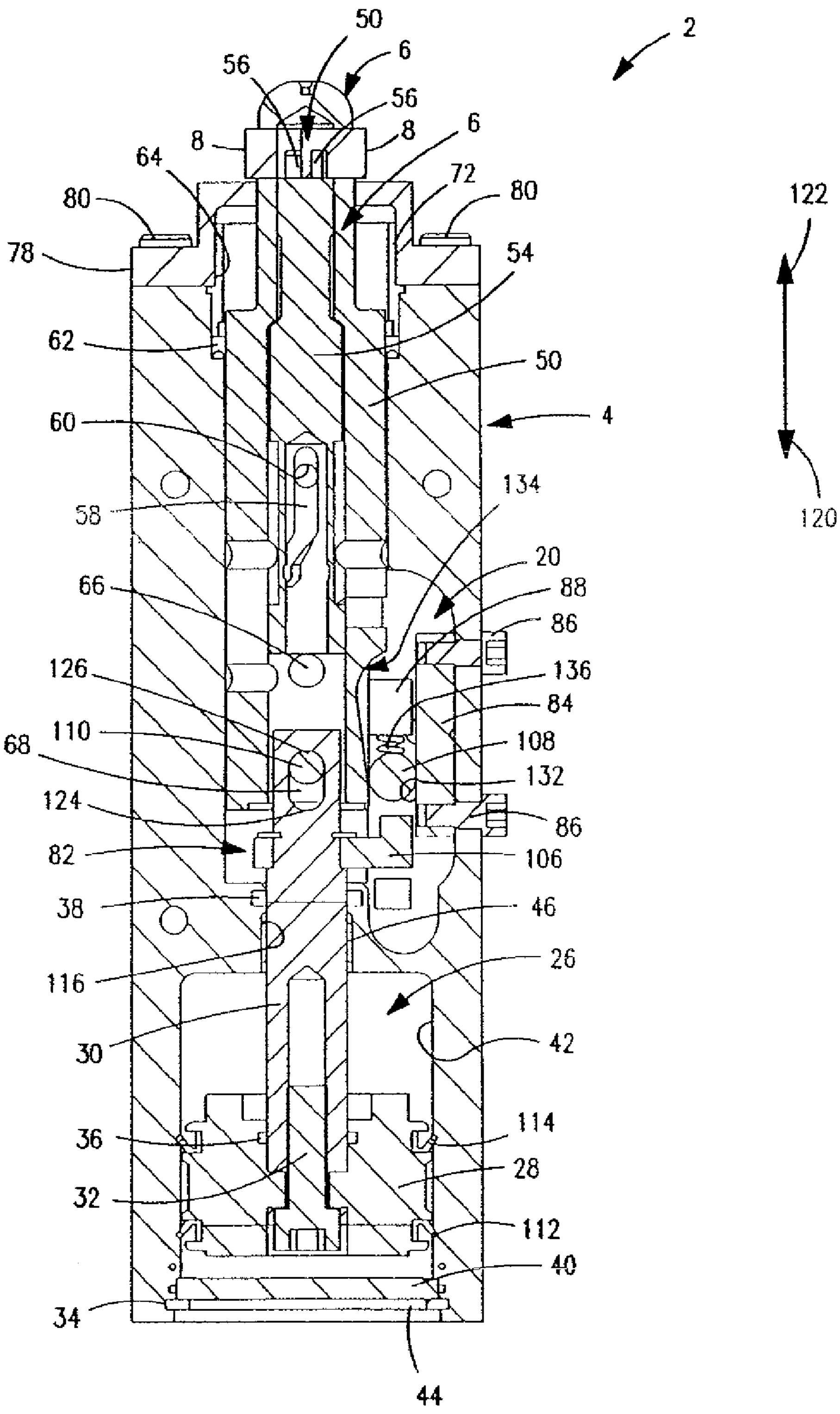
FIGS. 3*a* and *b* are side and detailed cross-sectional views, respectively, of the pin clamp of FIG. 1.

A cross-sectional view of pin clamp 2 is shown in FIG. 3*a*. This view shows the connection between the several structures within pin clamp 2. Specifically, piston 28 of pneumatic supply assembly 26 is shown located within bore 42 which is capped by end cap 40, retaining ring 44, and sealed with seal 34. Fastener 32 is shown attaching piston 28 to piston rod 30 with seal 36 located there between. Also shown in this view are seals 112, 114 which bound piston 28.

Piston rod 30 extends through bore 116 and into cavity 82. It is appreciated from this view how collar 46 may serve as a bearing surface for piston rod 30 and seal 38 separates cavity 82 from bore 42. Illustratively within cavity 82, piston rod 30 is coupled to body 50 of locating pin 6 via pin 110 which is disposed through bore 118 in body 50 and extends through slot 68 of piston rod 30. In this illustrative embodiment, movement of piston rod 30 in direction 122 will cause movement of slot 68 in direction 122 as well independent of pin 110 until it engages end 124 of slot 68. When this occurs, piston rod 30 moves body 50 and consequently locating pin 6 upwardly in direction 122. Conversely, as piston rod 30 is moved downwardly in direction 120, piston rod 30 moves independently of body 50 until pin 110 engages end 126 of slot 68. At that point body 50 is moved in direction 120.

Dowel pin 66 is disposed within bore 128 of body 50 and is configured to retain twist pin 54. Cam pin 60 is fixed in housing 4 and disposed through slot 70 of body 50 as well as cam slot 58 of twist pin 54, where it exits to engage another opposed slot in body 50 and fixed at the opposite end in housing 4. Also shown in this view is wiper seal 62 located within bore 64 between the inner wall of housing 4 and body 50. Fingers 8 are shown partially disposed within cavity 52 of locating pin 6 as a result of engagement with pins 56.

The attachment of unlocking mechanism 20 is also shown in FIG. 3*a*. In one illustrative embodiment lock release 106 is fastened to piston rod 30, while spring holder 88 is fastened to body 50. Plate 84 is fastened to the inside of cavity 82 via fasteners 86. Pin 108 is located between a bearing surface 132 on plate 84 and a cam surface 134 formed on body 50. A spring 136 is coupled to spring holder 88 and engages pin 108 to bias the same in direction 120.

Figure 3B:
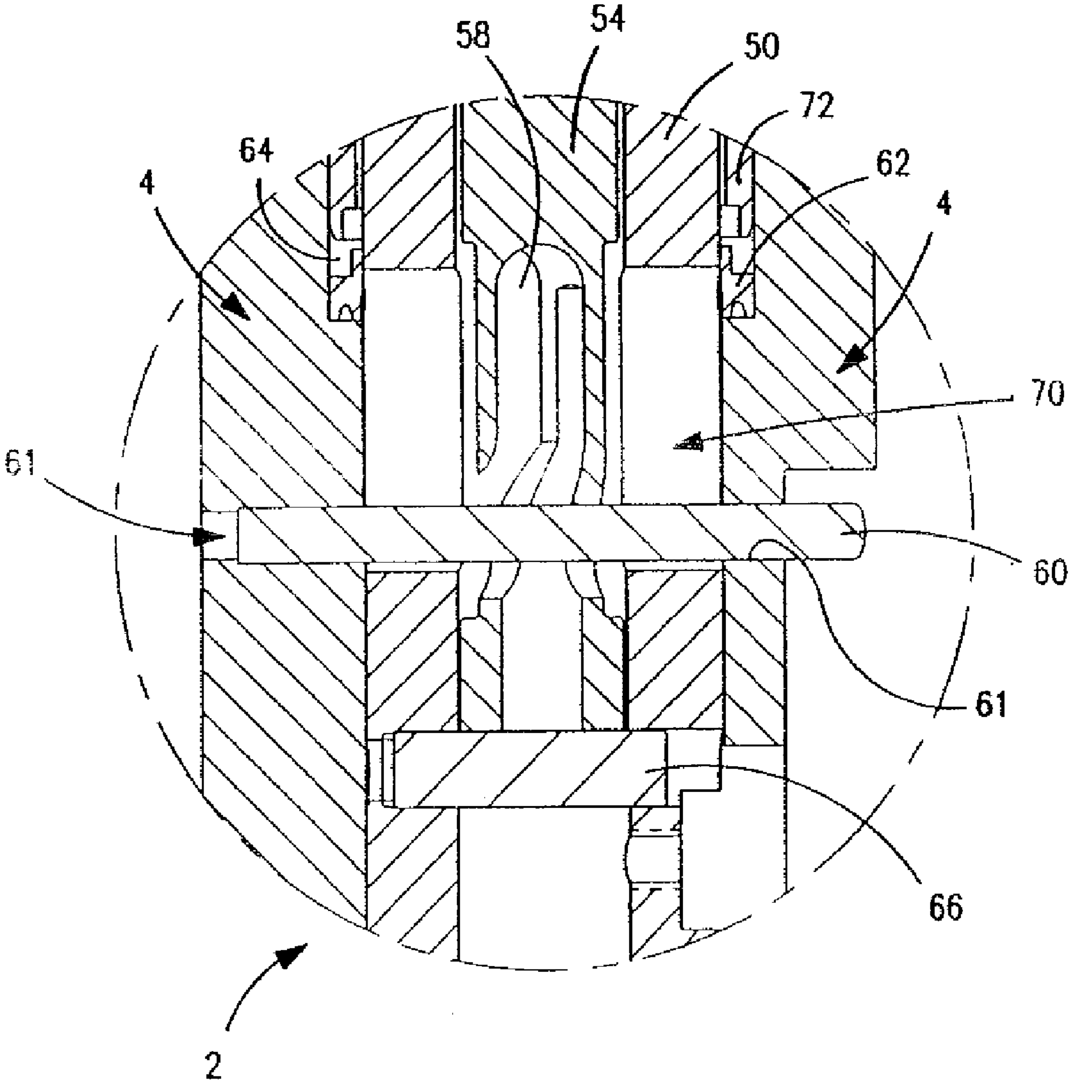

A detailed cross-sectional view of a portion of pin clamp assembly 2 is shown in FIG. 3*b*. This view specifically shows how cam pin 60 is disposed through housing 4, as well as cam slot 58. In this illustrative embodiment, cam pin 60 is disposed through bore 61 in one portion of housing 4 and is disposed through slot 58 of twist pin 64. Exiting therefrom and re-entering bore 61 disposed through an opposite portion of housing 4. The use of the single cam pin being disposed all the way through twist pin 54 as well as body 50 (through slot 70), allows alignment of body 50 and twist pin 54 within housing 4 by virtue of the single simple pin 60. In addition, this configuration does not require fasteners to secure pin 60 to housing 4. In addition, cam pin 60 can rotate which will reduce the wear experienced by its surface to possibly add increased cycle life.

Figure 4A:
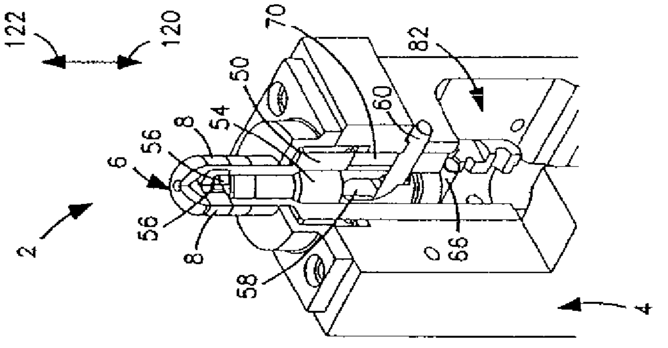
FIGS. 4*a* through 4*d* are various perspective views of the pin clamp assembly of FIG. 1.
Figure 4B:
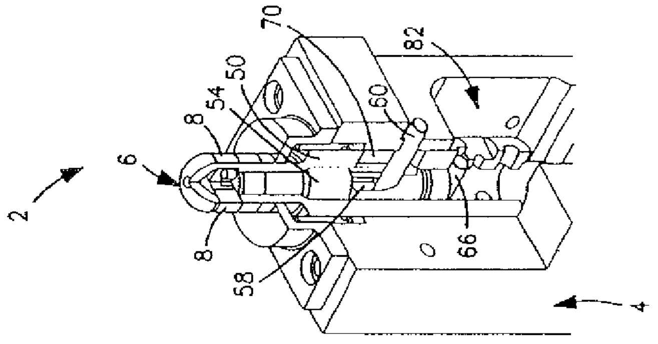

Several perspective views showing the progression of movement of locating pin 6 is shown in FIGS. 4*a* through 4*d*. As shown in FIG. 4*a*, locating pin 6 is extended upward in direction 122 to its upper most extent. In this position cam pin 60, being secured in housing 4 as shown, is positioned at the lower most extent of slot 70 of body 50 and the lower most extent of cam slot 58 of twist pin 54. Pin 66 secured to body 50 is shown retaining twist pin 54 in a vertical position with respect to locating pin 6. In this upper most extended position, cam slot 58 is configured such that the orientation of pins 56 at the end of twist pin 54 locate fingers 8 in a retracted position. The perspective view of pin clamp assembly 2 shown in FIG. 4*b* depicts movement of locating pin 6 downward in direction 120. It is notable that in this view slot 70, as well as cam slot 58, appears to move in direction 120 relative to cam pin 60. This causes cam pin 60 to be positioned farther up within slot 70, as well as up the cam path of cam slot 58. The result of this movement is that twist pin 54 twists or pivots within locating pin 6 along its longitudinal central axis pursuant to contour of the cam slot. This pivoting results in pins 56 pivoting as well. The movement of pin 66 causes fingers 8 to begin extending outwardly from locating pin 6.

Figure 4C:
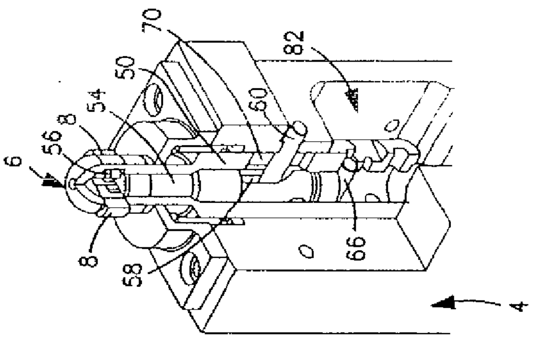
Figure 4D:
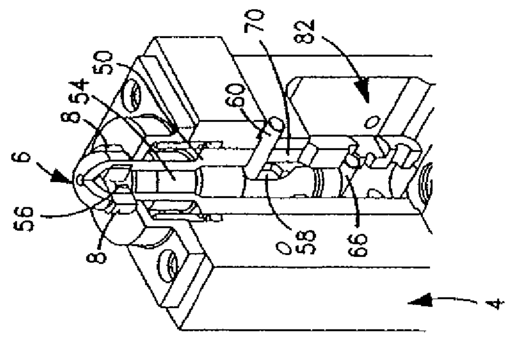

As shown in the locating clamp assembly 2 in FIG. 4*c*, locating pin 6 continues to move downwardly in direction 120. This continued downward movement moves cam pin 60 farther along slot 70 of body 50 as well as farther along cam slot 58. This movement continues to pivot twist pin 54 which causes continued rotation of pins 56 which essentially push fingers 8 farther outwardly from locating pin 6. As locating pin 6 reaches the end of its stroke in direction 120, as shown in FIG. 4*d*, cam pin 60 is shown reaching the upper most extent of both slot 70 and cam slot 58. Reaching the end of the stroke also means that twist pin 54 has pivoted pins 56 which moves fingers 8 outward to their outer most extent. It is appreciated that in this position, a workpiece can be held between fingers 8 and plate surface 10.

Figures 5A, 5B:
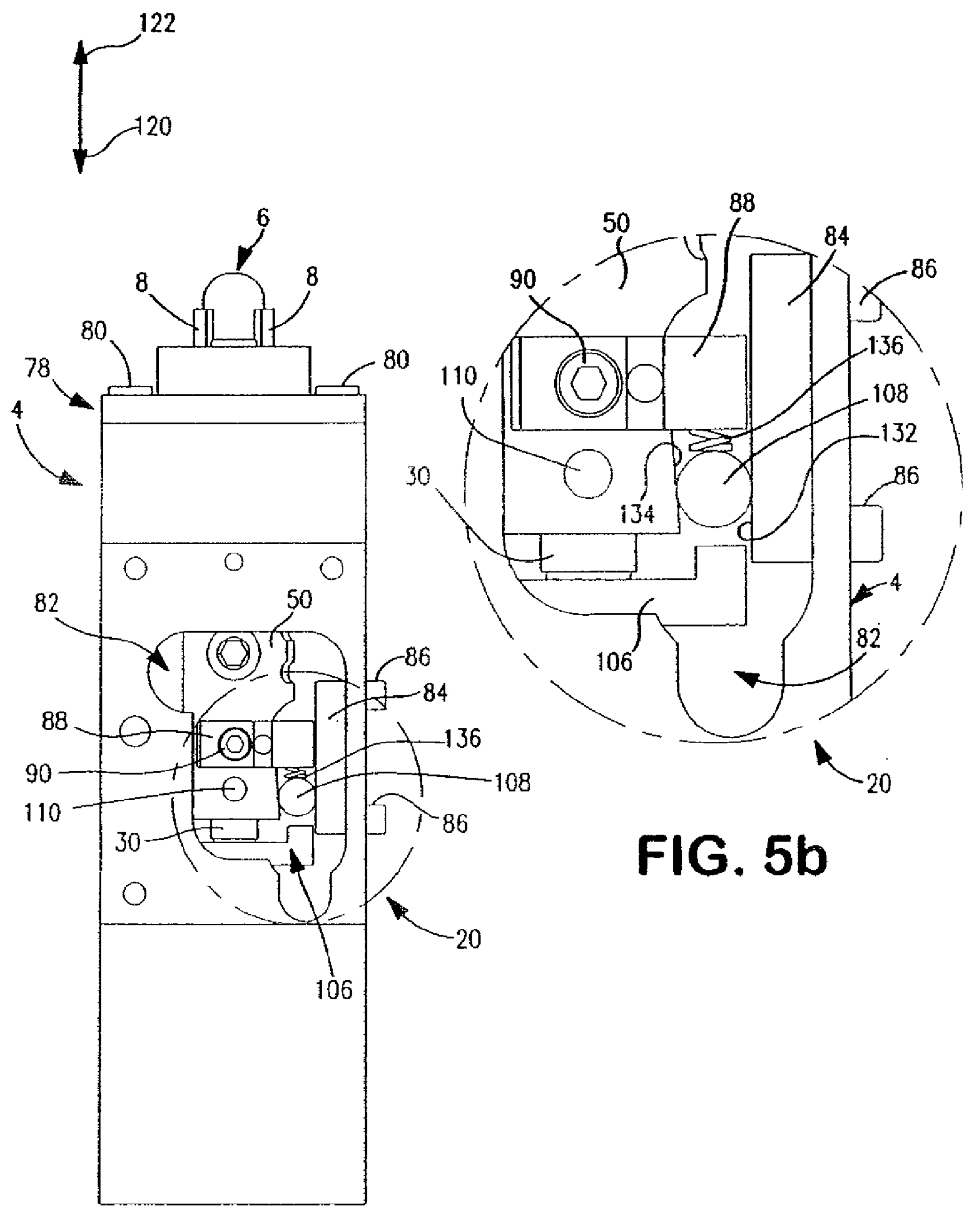
FIGS. 5*a* and *b* are side and detail views respectively, of a portion of the pin clamp assembly of FIG. 1, showing an illustrative embodiment of the locking mechanism.

Side and detail views of unlocking mechanism 20 of pin clamp 2 are shown in FIGS. 5*a* and *b*. As shown in FIG. 5*a*, cavity 82 is formed in the housing 4 of pin clamp 2. This cavity 82 provides access to body 50, as well as piston rod 30. In one illustrative embodiment of unlocking mechanism 20, it is configured to manually move locating pin 6 upward in direction 122 to retract the fingers and allow release of any held workpiece. In this illustrative embodiment as shown in FIG. 5*b*, a lever 100 (see FIG. 2) or other structure or mechanism can push pin 108 upward unwedging pin 108 from between surfaces 134 and 132. The force of the lever moving upward is greater than the downward bias of spring 136 to cause pin 108 to position itself in a nonwedging position between surfaces 134 and 132. The illustrative shape of cam surface 134 is such that in the lower position, that surface serves as a wedging surface, whereas farther upward thereon, it no longer possesses such wedging properties. With pin 108 unwedged, the lever 100 will be free to push body 50 upward which causes cam pin 60 to move upward in direction 122. This causes cam pin 60 to follow slot 58 which pivots pins 56 to retract fingers 8 inward with respect to locating pin 6.

In another illustrative embodiment, mechanism 20 may also be a locking mechanism. This can be particularly useful during loss of fluid power to clamp 2. Illustratively, when body 50 is moved in the downward direction 120, the location of pin 108 with respect to the body 50 is caused to be wedged between surfaces 132 and 134 by the bias created from spring 136. This wedging between the two surfaces prevents locating pin 6 from moving upwardly in direction 122.

Figure 6:
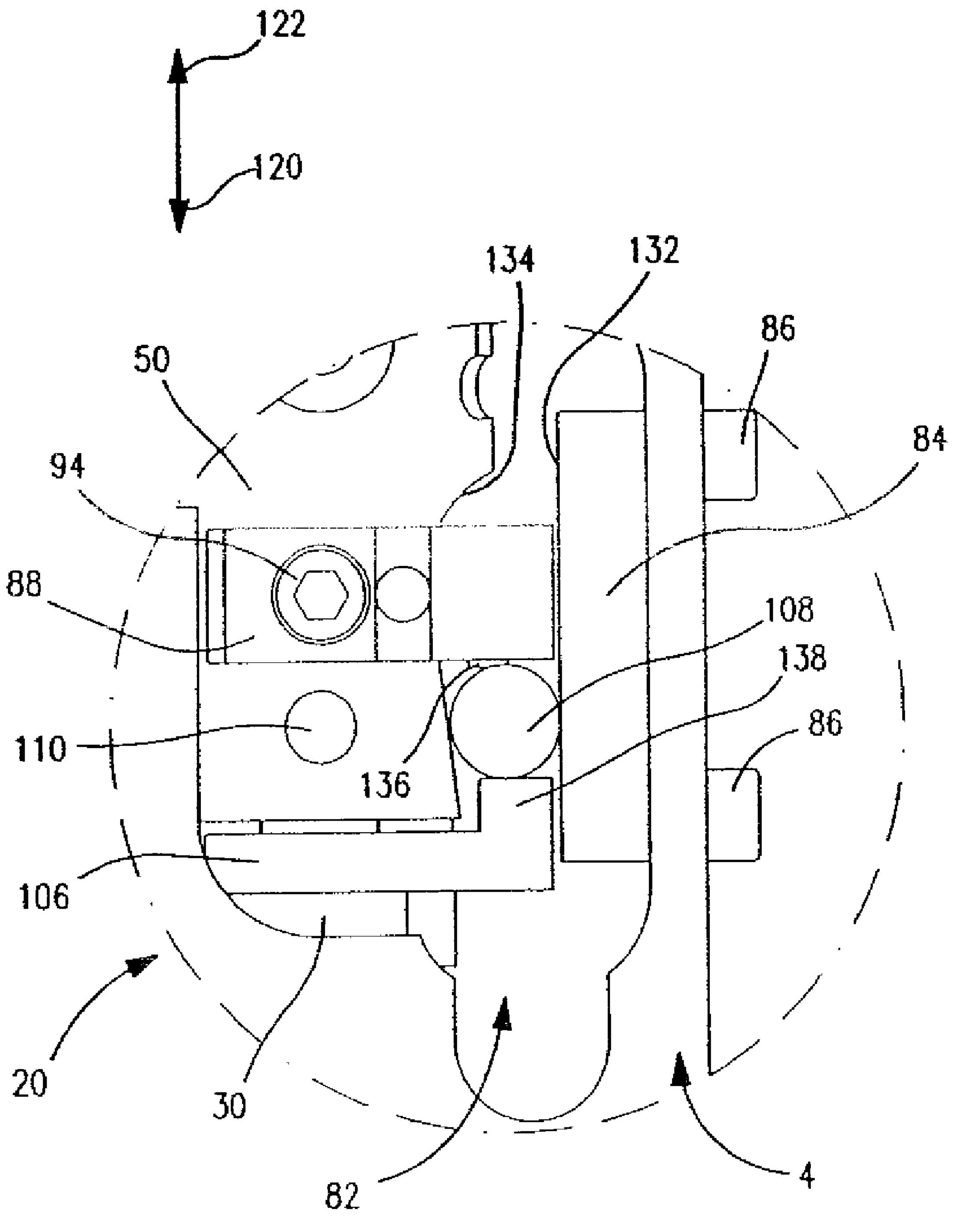
FIG. 6 is a detailed view of a portion of the pin clamp of FIG. 5*a* also showing the locking mechanism.

When power is restored to clamp 2, however, the force of that power is sufficient to overcome the wedging force created by pin 108 and surfaces 132, 134. This is illustratively accomplished by the lock release 106 attached to piston rod 30 as shown in FIG. 6. In this illustrative embodiment, slot 68 and piston rod 30 (see FIG. 3*a*) allow movement of piston rod 30 to some extent before it engages and moves body 50. In this embodiment that extent of travel is enough to allow head 138 of lock release 106 to engage pin 108. Using the force of the traveling piston rod 30, pin 108 is pushed out of the way, thus, unwedging it from between surfaces 132 and 134 prior to piston rod 30's engagement and movement of body 50. Once pin 108 is unwedged, body 50, and ultimately locating pin 6, will be free to move upwardly in direction 122.

Figure 7C:
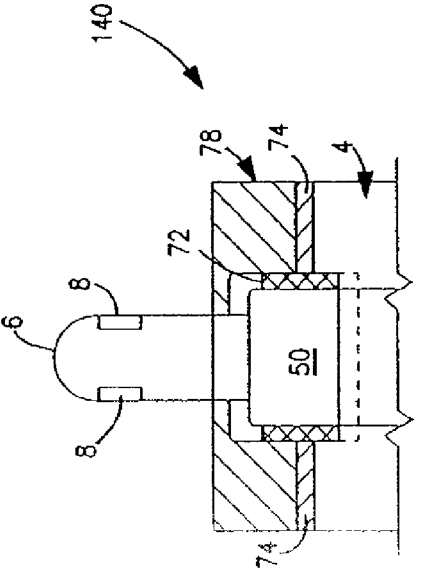
FIGS. 7*a* through 7*c* are exploded, perspective, and cross-sectional detail views of an illustrative embodiment of a shim and sleeve assembly.
Figure 7B:
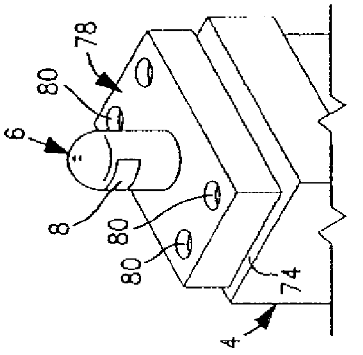
Figure 7A:
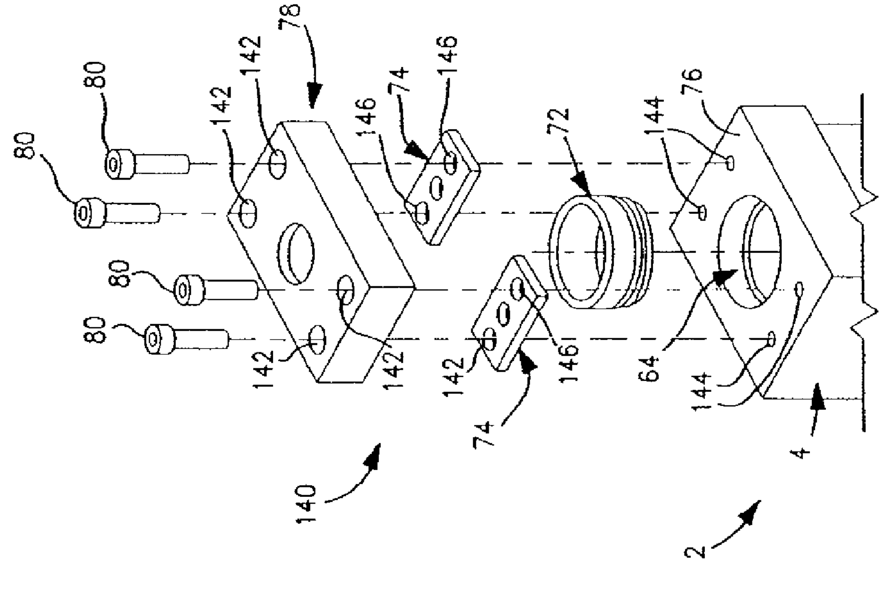

Exploded, perspective, and cross-sectional detailed views of an illustrative shim and sleeve assembly 140 is shown in FIGS. 7*a* through 7*c*, respectively. As shown in the exploded view of FIG. 7*a*, shim and sleeve assembly 140 comprises a sleeve 78 that is fastened to top 76 of housing 4 via fasteners 80 disposed through bores 142 and 144 disposed through sleeve 78 and top 76, respectively. In one illustrative embodiment, shims 74 include bores 146 disposed therethrough that also receive fasteners 80. Shims 74 can, thus, be sandwiched and secured between sleeve 78 and top 76 of housing 4. It is appreciated, however, that the thickness of shims 74 can be any amount that is useful to provide a desirable amount of shrouding about locating pin 6. The perspective view of shim and sleeve assembly 140 is shown in FIG. 7*b*. This view shows how locating pin 6 extends from bore 79 of sleeve 78. The cross-sectional view of FIG. 7*c* further illustrates the utility of shims 74. As shown herein, shim 74 allows sleeve 78 to be adjusted upward or downward along locating pin 6. The use of such shims 74 means that the top surface of sleeve 78 may not require machining to obtain a desired amount of coverage about locating pin 6.

Figure 8C:
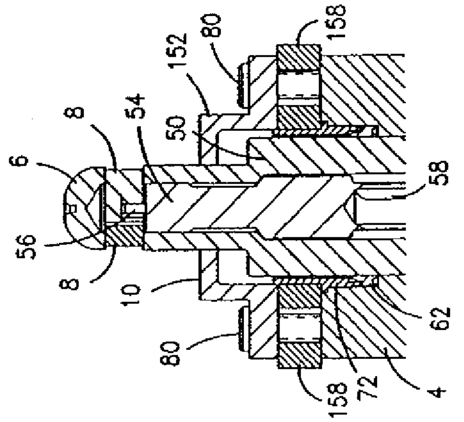
FIGS. 8*a* through 8*d* are several cross-sectional views of a portion of the pin clamp showing another embodiment of a shim and sleeve assembly, as well as an illustrative embodiment of a wiper seal.
Figure 8B:
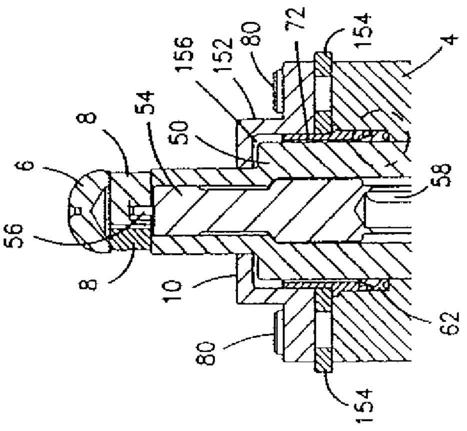
Figure 8D:
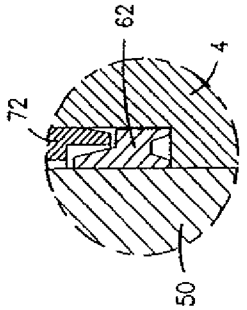
Figure 8A:
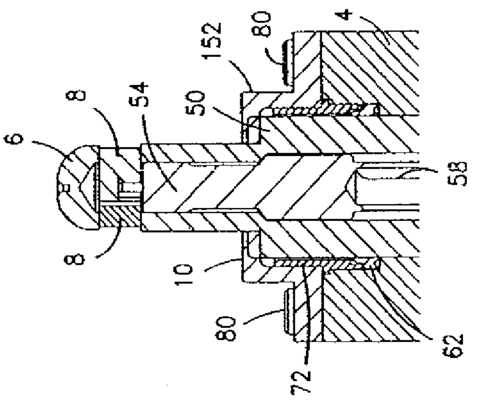

Several cross-sectional views of a portion of the pin clamp assembly 2 showing an alternative embodiment of shim and sleeve assembly 148 is shown in FIGS. 8*a* through *c*. A detail view of a portion of assembly 2 with wiper seal 62 is shown in FIG. 8*d*. With regard to shim and sleeve assembly 148, FIG. 8*a*, shows an illustrative embodiment of sleeve 152 having a stepped portion which forms plate surface 10 that engages a portion of a workpiece when fingers 8 become engaged. In this illustrative embodiment, fasteners 80 are configured to be disposed through sleeve 152 and attach the same to housing 4. In this first view, no shim is used between housing 4 and sleeve 152. In contrast, as shown in FIG. 8*b*, the same view of pin clamp 2 with sleeve assembly 148 attached thereto includes a shim 154 that effectively raises sleeve 152 upward relative to locating pin 6 to provide additional protection thereto. In this illustrative embodiment the amount of additional protection can be illustratively quantified by measuring an increase or decrease in gap 156 located between the underside of sleeve 152 and body 50. Shim and sleeve assembly 148, as shown in FIG. 8*c*, includes an illustrative thicker shim 158 that extends sleeve 152 further upward along locating pin 6 then shims 154. It is evident by comparing FIGS. 8*a* through *c* that the thicker the shim 158 attached to housing 4 and sleeve 152, the more of locating pin 6 is shrouded by sleeve 152.

As shown in FIG. 8*d*, wiper seal 62 is configured to engage the outer periphery of body 50. Wiper 62 is illustratively made from a flexible polymer material that essentially rubs against the outer periphery of body 50 to prevent any dirt or other contaminants thereon from penetrating to the structures located within housing 4.

Figure 9:
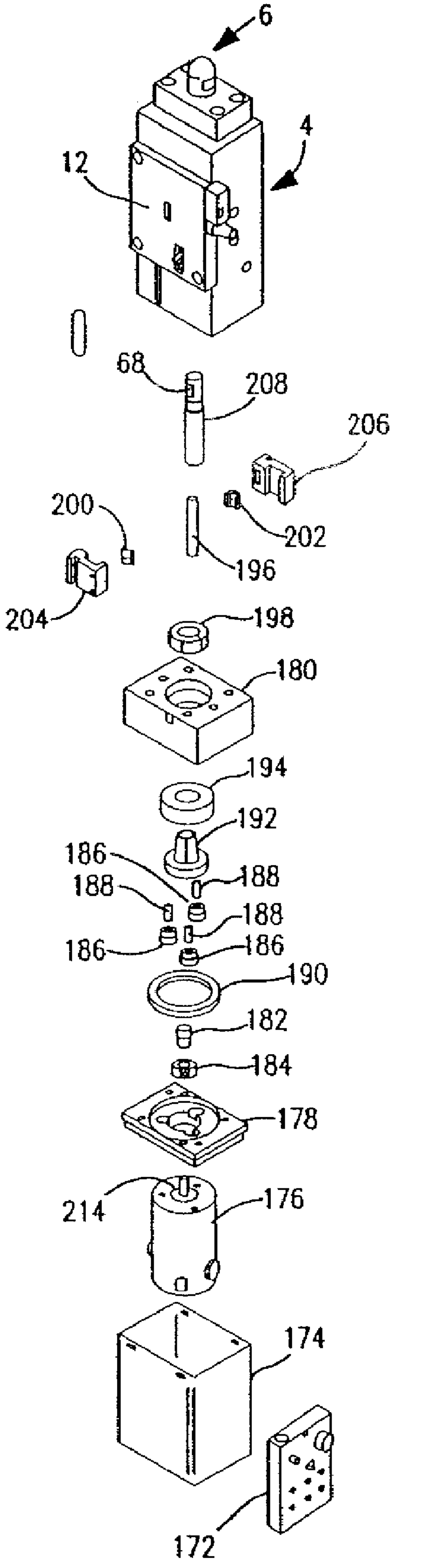
FIG. 9 is an exploded view of another illustrative embodiment of a pin clamp assembly having an electric actuator coupled thereto.

An exploded view of another illustrative embodiment of a pin clamp assembly 170 is shown in FIG. 9. In this illustrative embodiment the clamp assembly portion, i.e. the housing for locating pin 6, cover plate 12 and many of the internal structures that move locating pin 6, is also used herein with respect to assembly 170. The primary distinction between the two embodiments is that pin clamp assembly 170 is electrically driven, as opposed to pin clamp assembly 2 which is pneumatically driven. As shown herein, controller 172 is illustratively mounted to cover 174. The controller 172 can illustratively be configured to receive signals from an amplifier box and/or a customer control unit (not shown) to control motor 176 located within cover 174. Motor adapter plate 178 illustratively mounts motor 176 to block 180 which is attached to housing 4. In this illustrative embodiment, motor 176 positively drives sun gear 182 via cam coupling 184. Sun gear 182 in turn drives planet gears 186 which revolve about shafts 188 while turning inside ring gear 190. In this illustrative embodiment shafts 188 are pressed into, or otherwise affixed, to output hub 192. This causes hub 192 to revolve by the rotation of planet gears 186. Output hub 192 is illustratively supported by bearing 194 which is also secured to block 180. Output hub 192 is also coupled to drive screw 196 via clamp coupling 198. Split nut halves 200, 202 engage drive screw 196 and are held in place via carriers 204, 206, respectively. This arrangement allows the ability to manually release and cycle the electrical mechanism without power while still maintaining synchronization between controller 172, and drive screw 196. It is contemplated that an illustrative alternate embodiment would comprise split nuts 200, 202 being formed integral with carriers 204, 206. In the present embodiment, carriers 204, 206 engage drive rod 208 via slots 210 illustratively located opposite slot 68 which is formed similar to that of slot 68 of rod 30 from the prior illustrative embodiment. (See FIG. 2.) It is contemplated that slots 210 assist in preventing rotation of carriers 204, 206. It is further contemplated that drive rod 208 is movable in a linearly reciprocal fashion such as that described with respect to assembly 2. The distinction here being that the electric motor 176, along with the gear assemblies previously discussed, move rod 208 in such a fashion as opposed to the pneumatic power applied to piston 28. The rotational movement from motor 176 is translated into linear movement via drive screw 196 on rod 210.

Figure 10:
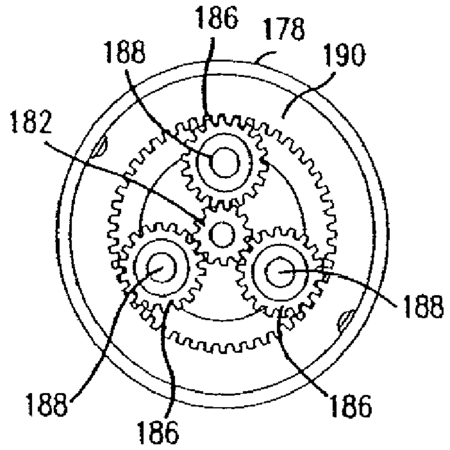
FIG. 10 is a top view of an illustrative gear assembly portion of the electric actuator for the pin clamp assembly of FIG. 9.

A top view of an illustrative embodiment of a portion of the gear assemblies for pin clamp assembly 170 is shown in FIG. 10. This view shows motor adapter plate 178 retaining ring gear 190 having teeth illustrative disposed along its inner periphery that engages corresponding teeth on planet gears 186 that rotate about shafts 188. The teeth of gears 186 also correspond and engage teeth on sun gear 182.

Figure 11:
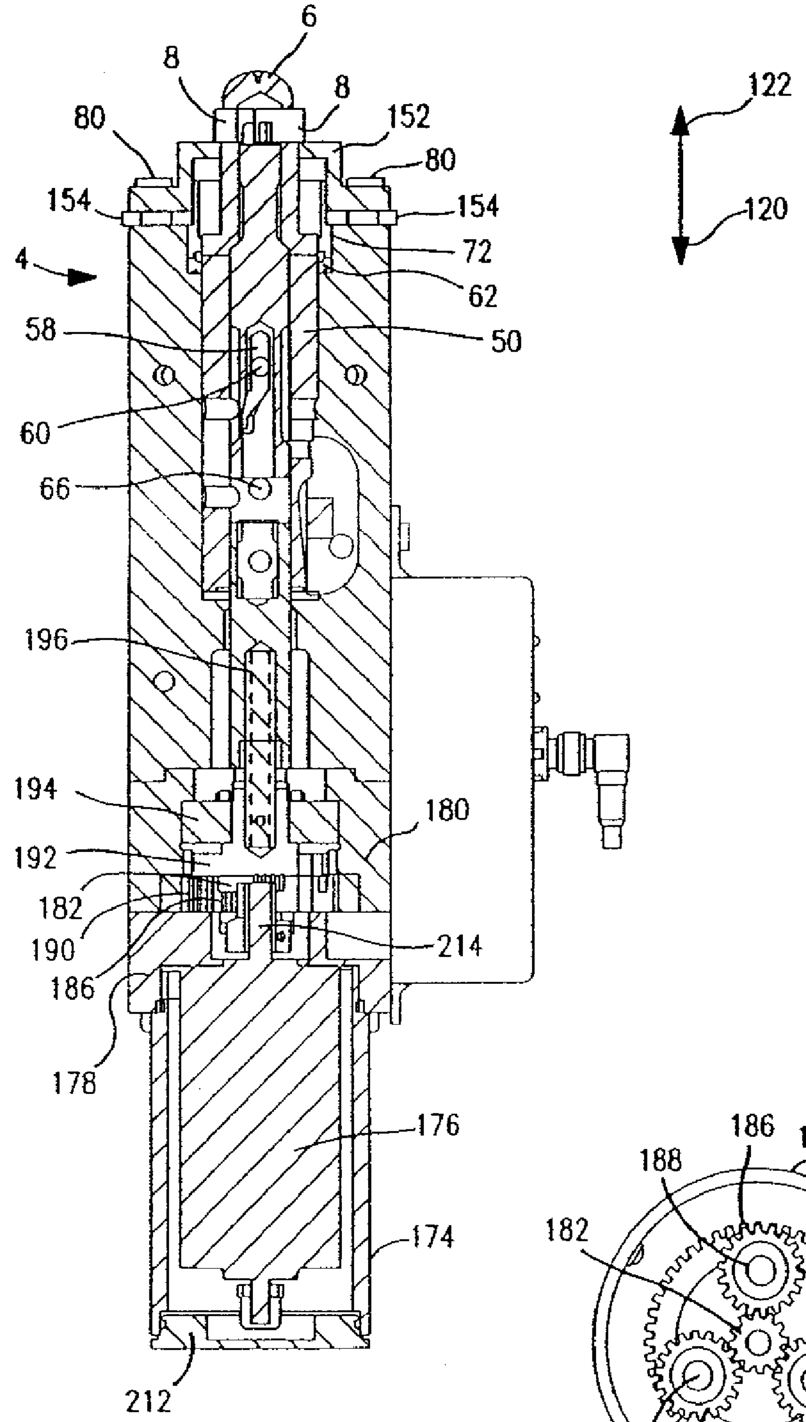
FIG. 11 is a side cross-sectional view of the pin clamp assembly of FIG. 9.

A side cross-sectional view of pin clamp assembly 170 is shown in FIG. 11. This view shows the attachment of the electrical drive mechanism to the pin clamp. For example, motor 176 is shown located within cover 174 with an end cap 212 located at the end thereof. Shaft 214 is shown extending up through motor adapter plate 178 and attaching to sun gear 182. The planet gears 186 are shown engaged with sun gear 182, as well as ring gear 190. The output hub 192 is shown located in block 180 and coupled to drive screw 196 and movable about bearing 194. Block 180 is itself attached to the housing 4 of the pin clamp assembly. As shown, drive screw 196 is disposed in drive rod 208 moving it in directions 122 and 120 as screw 196 rotates. This movement in directions 120 and 122 of drive rod 208 is analogous to the movements of rod 30 in the previous embodiment. Accordingly, the remaining structures within housing 4 operate the same as described with respect to assembly 2 to move and operate locating pin 6 as previously discussed. (See, e.g., FIG. 4.)

Illustrative embodiments of pin clamp accessories, including detent and stripper assemblies, are shown in FIGS. 12 through 18. These accessories assist the pin clamp in being more functional than conventional pin clamps by accomplishing tasks that ordinary pin clamps may not otherwise perform.

Figure 13:
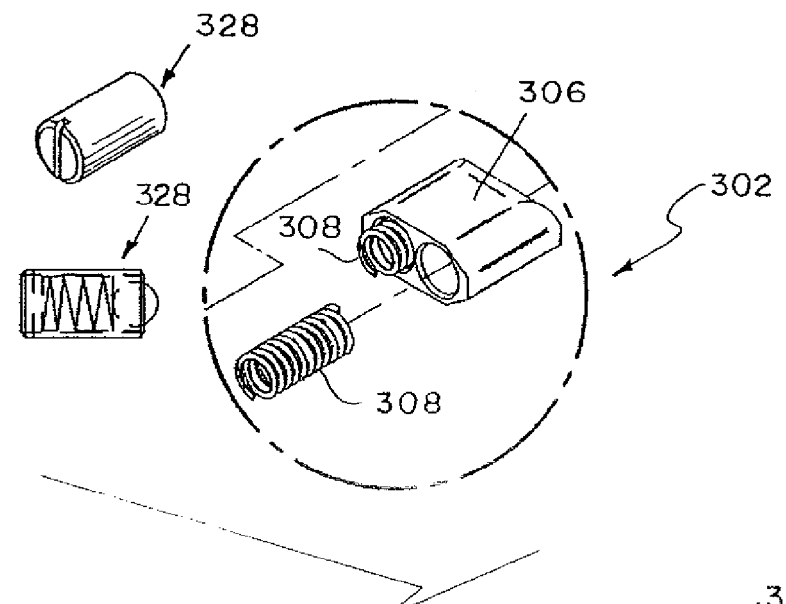
FIG. 13 is a detail-exploded view of a detent assembly taken from section B of FIG. 12.
Figure 12:
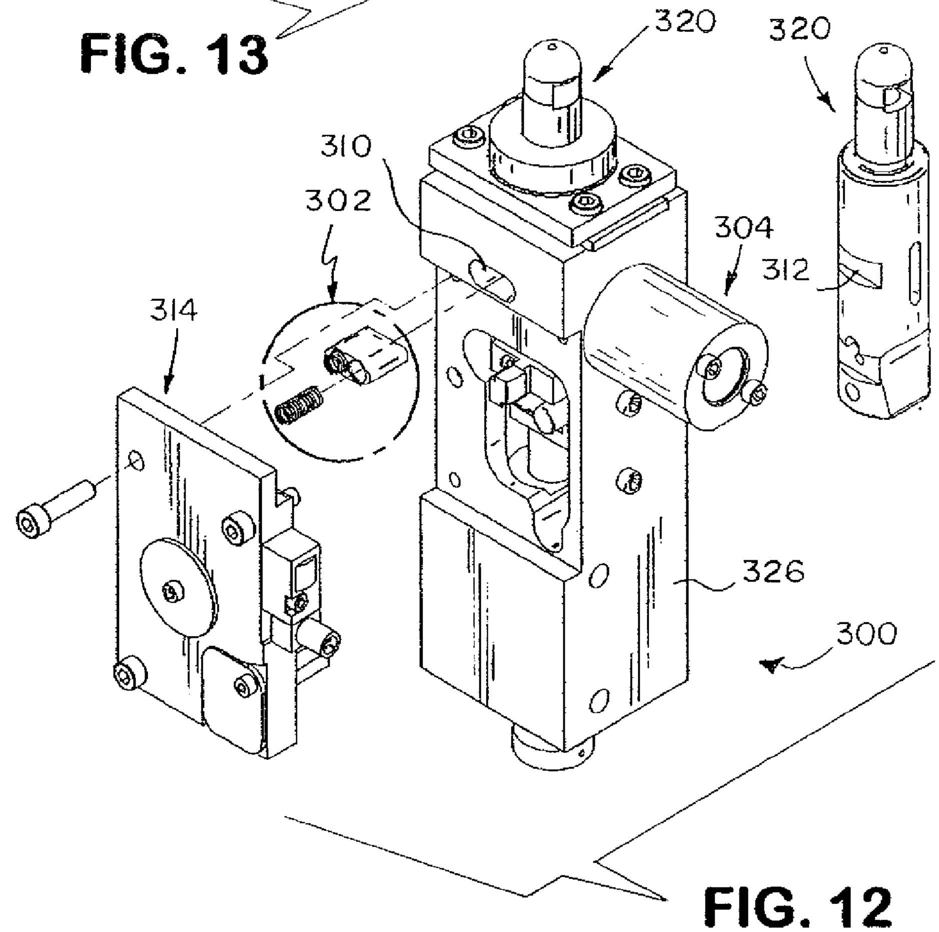
FIG. 12 is an exploded-perspective view of a pin clamp assembly that includes illustrative embodiments of a detent assembly and a stripper assembly.
Figure 14B:
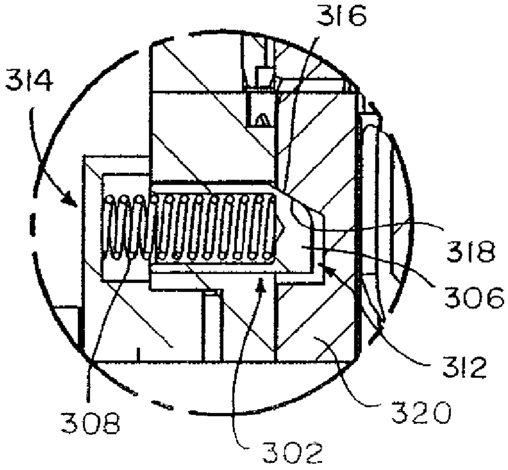
FIGS. 14*a-b* are side cross-sectional and detail views of a portion of the pin clamp assembly with the illustrative detent assembly attached thereto.

An illustrative embodiment of a pin clamp 300 is shown in an exploded-perspective view in FIG. 12. This illustrative embodiment includes a detent assembly 302 and a parts stripper assembly 304 accessory attachments. Illustrative embodiments of a detent assembly are shown in FIGS. 13 through 15. In one illustrated embodiment, the locating pin can be held in the extended position in the absence or reduction of actuation force such as air pressure. As specifically shown in FIGS. 12 and 13, detent assembly 302 includes a detent 306 comprising springs 308 illustratively disposed at least partially therein. Detent 306 is disposed in bore 310 of housing 326 of clamp 300, and is engagable with groove 312 of locating pin 320. Illustratively, spring retainer plate 314 is positioned adjacent detent 306 and engages springs 308 to bias detent 306 towards groove 312.

Figure 14A:
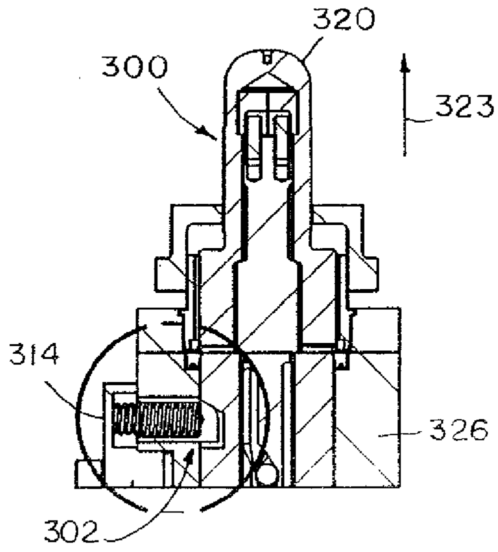
Figure 15B:
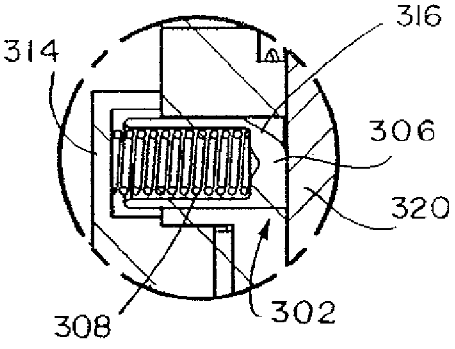
FIGS. 15*a-b* are additional side cross-sectional and detail views of a portion of the pin clamp assembly with the illustrative detent assembly attached thereto.

As shown in the cross-sectional and detail views of pin clamp 300 in FIGS. 14*a* and *b*, detent 306 engages groove 312. In this illustrative embodiment, both detent 306 and groove 312 include angled surfaces 316 and 318, respectively, so that detent 306 can be extricated from groove 312 when locating pin 320 moves via a moving force. In this illustrative embodiment, locating pin 320 extends in direction 323 which causes groove 312 to engage detent 306.

Figure 15A:
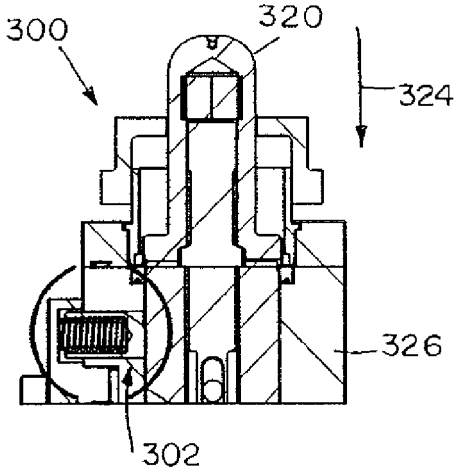
Figure 16:
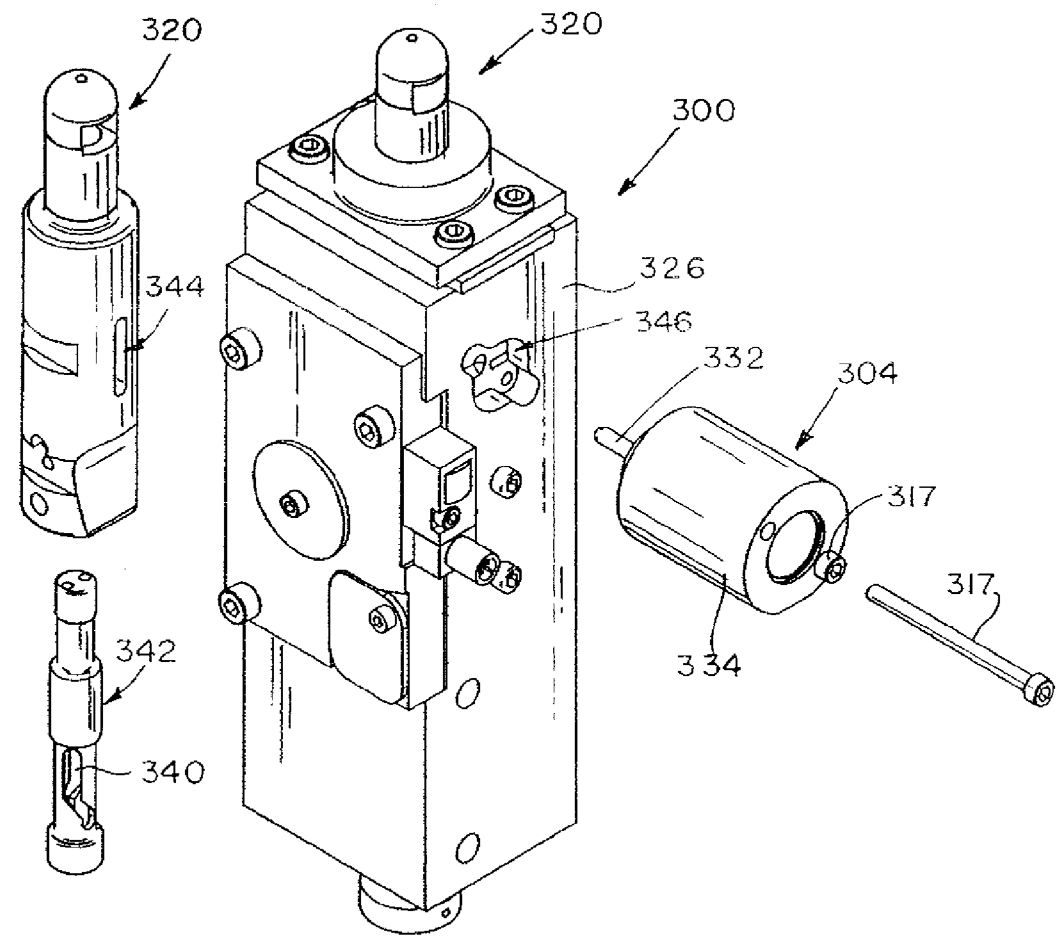
FIG. 16 is an exploded perspective view of a pin clamp assembly and illustrative stripper assembly.

Conversely, as shown in the side cross-sectional and detail views in FIGS. 15*a* and *b*, as locating pin 320 retracts in direction 324, detent 306 is extricated from the groove 312. The angled surfaces 316 and 318, in combination with the moving force of locating pin 320, pushes detent 306 against the bias force of springs 308 and out of groove 312. Because a force is required to remove detent 306, locating pin 320 maintains its extended position even when no pressure or other applied force is experienced. When locating pin 320 retracts under actuator force, however, it is enough to push detent 206 out of groove 212.

It is appreciated that the configuration of the components of the detent assembly are illustrative, and that the configuration of the components can be changed in other embodiments. For example, an alternate embodiment the detent may be a "ball detent" 328, such as that shown in FIG. 13. Other illustrative embodiments may work as well so long as locating pin 320 is selectively bound, such as when pressurization or other actuator force in the clamp is reduced or lost.

Figure 17B:
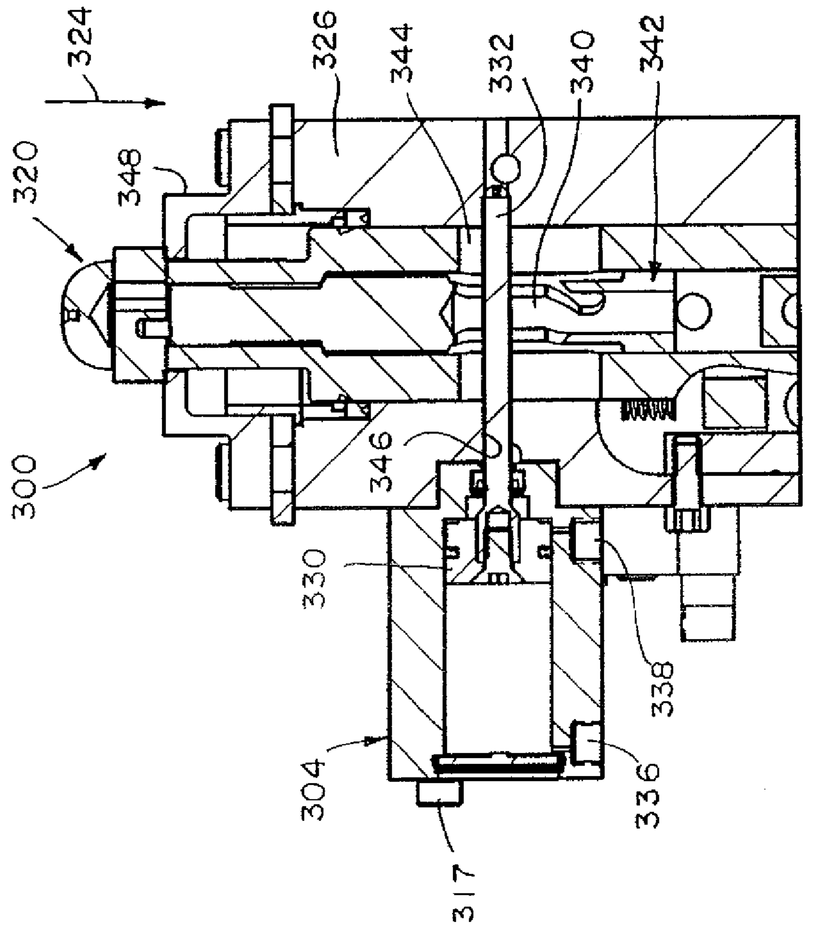
FIGS. 17*a-b* are side and cross-sectional views of the pin clamp assembly with a stripper assembly attached thereto.
Figure 17A:
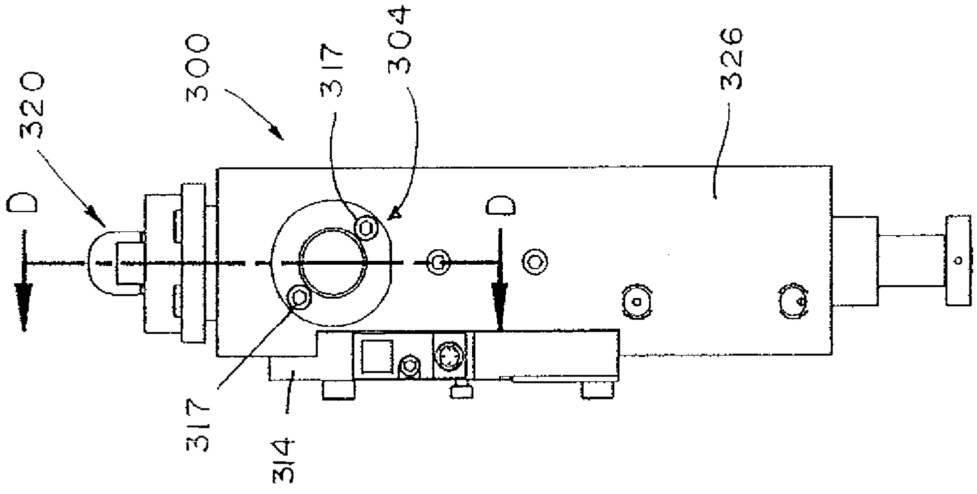
Figure 18A:
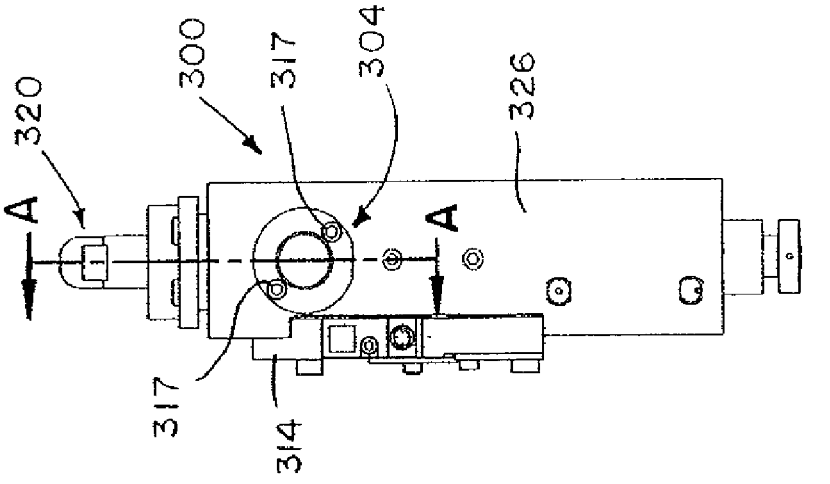
FIGS. 18*a-b* are addition side and cross-sectional views of the pin clamp assembly with a stripper assembly attached thereto.
Figure 18B:
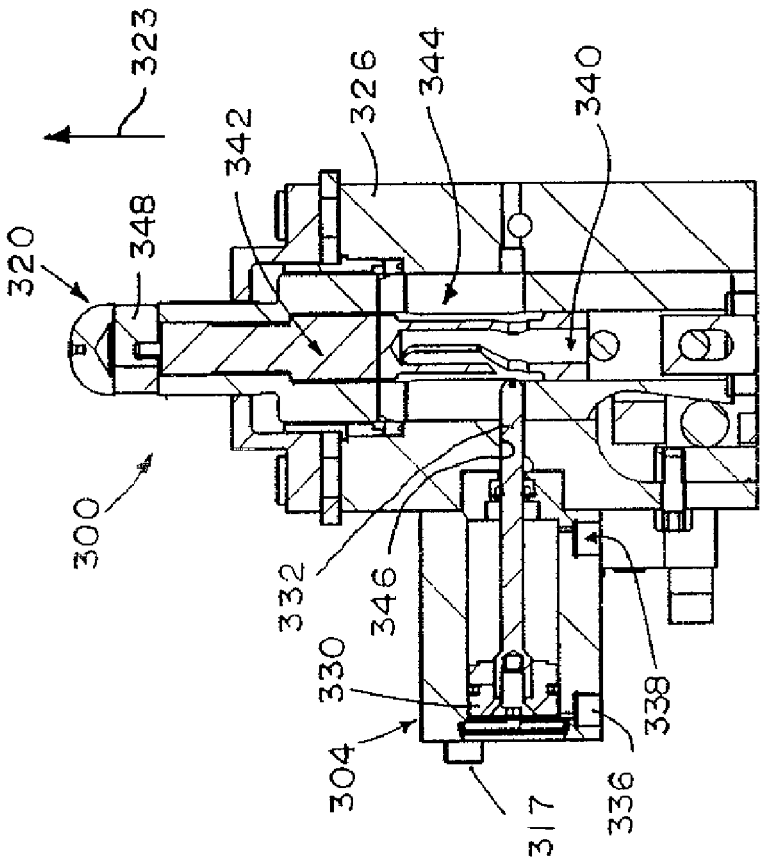

Another accessory to pin clamp 300 is parts stripper assembly 204. (See e.g., FIGS. 16 through 18.) Assembly 304 would replace the dowel pin or pins that cause twist pin 54 to rotate moving the fingers 8 to extend outward from locating pin 6, as shown in FIGS. 1-4, for example. Illustratively, piston 330 is attached to pin 332 as shown in FIGS. 17*b* and 18*b*. Piston 330 is located within cylinder 334 which attaches to housing 326 of clamp 300 via illustrative pins 317. In one illustrative embodiment piston 330 is driven via fluid, such as air, through fluid ports 336 and 338. It is appreciated that pin 332 could be driven via electric, magnetic, or other driving means, in alternative embodiments.

As shown in FIG. 17*b*, when fluid is applied to port 336, piston 330 moves and pin 332 is forced through cam slot 340 of twist pin 342, as well as cam slot 344 of locating pin 320 and opening 346 in housing 326. This causes twist pin 342 to rotate pursuant the path of cam slot 340 and move fingers 348 to the extended or clamping position as locating pin 320 retracts in direction 324. It is appreciated that in one embodiment, pin 332 can be disposed completely through twist pin 342 and locating pin 320. In another embodiment, pin 332 can be disposed only partially within twist pin 342.

Conversely, when fluid is applied to port 338, pin 332 is retracted from opening 346 and slots 340 and 344 as shown in FIG. 18*b*. Locating pin 320 is, therefore, allowed to travel up and down in directions 324 and 323 without rotation of twist pin 242. This means that fingers 348 will not be extended to the clamping position. Rather, fingers 348 will remain in an unclamped position. This is useful to allow any clamped material that adheres or becomes stuck to the locating pin, to be forced loose so the material can be removed or stripped from the locating pin, without interference from fingers 348.

It is appreciated that the stripper assembly shown is illustrative. In alternative embodiments, for example, stripper assembly 304 is not limited to a pneumatic driven cylinder. It could be replaced with an electrically driven device or a device that is powered in one direction and spring driven in the opposite direction, for example. It is further appreciated that pin 332 does not necessarily need to travel completely through twist pin 342, then through the locating pin 320, slot 344, and into the opening 346 of the body 326. This device may also work by pin 332 going a partial way through the twist pin 342. Pin 332 may still engage the cam slot 240 of twist pin 242 to cause it to rotate. The rotation extends and retracts fingers 248 of the clamp assembly. Furthermore, the specific structures that pin 332 engages are illustrative in both shape and movement.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A pin clamp assembly comprising:
a clamp housing;
a locating pin at least partially located within the clamp housing;
at least one finger extendable out of and retractable into the locating pin;
a pin having a cam slot disposed therein;
wherein the cam slot is located within the locating pin and the clamp housing;
wherein the locating pin includes an opening in communication with the cam slot of the pin;
a strip off pin that is selectively disposable into and out of the cam slot of the pin and the opening of the locating pin;
wherein when the pin is positioned out of the cam slot and opening, the locating pin is movable without extending or retracting the finger; and
wherein when the pin is positioned in the cam slot and opening, the pin is movable to retract or extend the finger into or out of the locating pin.

2. The pin clamp assembly of claim 1, further comprising an actuator that selectively moves the strip off pin between positioned into and out of the cam slot and opening.

3. The pin clamp assembly of claim 1, wherein as the strip off pin is moved out of the cam slot, the locating pin can move without extending or retracting the fingers.

4. The pin clamp assembly of claim 1, wherein the actuator is pneumatically powered.

5. The pin clamp assembly of claim 1, wherein the shape of the cam slot controls a portion of the movement of the pin when the strip off pin is disposed therein.

6. The pin clamp assembly of claim 1, wherein as the strip off pin is moved into the cam slot, the locating pin moves which extends or retracts the fingers.

* * * * *